Oct. 31, 1961  G. A. DMITROFF  3,006,140
POWER SUPPLY SYSTEM INCLUDING ENGINE STARTING MEANS
Filed Sept. 3, 1957  2 Sheets-Sheet 1

INVENTOR
GEORGE A. DMITROFF
BY Jack N. McCarthy
AGENT

INVENTOR
GEORGE A. DMITROFF
BY Jack N. McCarthy
AGENT

United States Patent Office 3,006,140
Patented Oct. 31, 1961

3,006,140
POWER SUPPLY SYSTEM INCLUDING
ENGINE STARTING MEANS
George A. Dmitroff, Trumbull, Conn., assignor to United
Aircraft Corporation, East Hartford, Conn., a corporation of Delaware
Filed Sept. 3, 1957, Ser. No. 681,556
8 Claims. (Cl. 60—18)

This invention relates to power systems for making aircraft self-sufficient in that all necessary ground power will be supplied by the aircraft.

An object of this invention is to provide power generating means which can be operated either by the engine used to supply motive force to the aircraft or by an auxiliary engine carried within the aircraft.

Another object of this invention is to provide ground power for an aircraft which will provide a weight saving over other known power generating systems.

A further object of this invention is to provide aircraft with an integrated ground power system which will operate the regular aircraft generator.

Another object of this invention is to provide a supplemental power system controlling the aircraft generator which includes an auxiliary engine with automatic means for starting said engine.

A further object of this invention is to provide a drive unit between a main engine and auxiliary engine and an aircraft generator through which either of the engines can drive the generator.

Another object of this invention is to provide means for cooling the aircraft generator when it is being operated by the auxiliary engine.

These and other objects and advantages of the invention will be evident or may be pointed out in connection with the following detailed description of the drawings in which one embodiment of the invention is illustrated.

Figure 1:
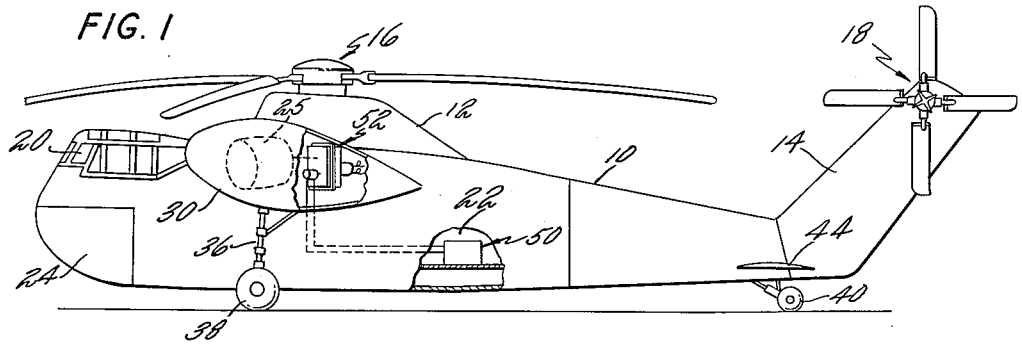
FIG. 1 is a side elevation of a helicopter showing the location of the auxiliary power system.

Referring to FIG. 1, the helicopter comprises essentially an elongated fuselage 10 having a main rotor pylon 12 and a tail rotor pylon 14 on which are mounted the main rotor generally indicated at 16 and a tail rotor generally indicated at 18.

The fuselage has a pilot compartment 20 ahead of the main rotor pylon 12, which is located in the upper part of the nose section of the fuselage. The space beneath the pilot compartment extends well aft beneath the main rotor and comprises the main cargo or passenger compartment 22 of the aircraft. Access to the cargo compartment is gained through a pair of clam shell doors 24 in the nose of the fuselage.

Engines 25, of which two are provided, are mounted one each in engine nacelles 30. An engine nacelle 30 is supported on one each side of the fuselage 10 at the end of a short wing section. These wings project laterally from the upper portion of the fuselage in the vicinity of the main rotor pylon.

The aircraft is supported on the ground by tricycle landing gear including main oleo struts 36 by wheels 38 which depend from the nacelles 30 and by a tail wheel 40 depending from the fuselage just forward of the tail rotor pylon 14. Stabilizer surfaces 44 extend outwardly and downwardly on each side of the tail pylon 14.

The main rotor is driven by an upright shaft which extends through the pylon 12 from a gear box located under said pylon. The engines are disposed in nacelles 30 to drive shafts extending through the wings into the gear box. Other details of construction of a helicopter of this type are disclosed in United States Patent No. 2,755,038 issued July 17, 1956, to M. E. Gluhareff for a Helicopter-Airplane with Engines Mounted on Fixed Wings.

The power system set forth by this invention comprises two main parts which are (1) the driving device 52 for mounting the aircraft generator 108 so that it may be driven by an aircraft engine 25 or by an auxiliary power device 58 and (2) an auxiliary power system 50 for operating the power device 58.

The main portion of the auxiliary power system 50 making this aircraft self-sufficient in its operation in the air and on the ground is located within the compartment 22 while the auxiliary power device 58 along with the driving device 52 is located adjacent the aircraft engine.

Figure 3:
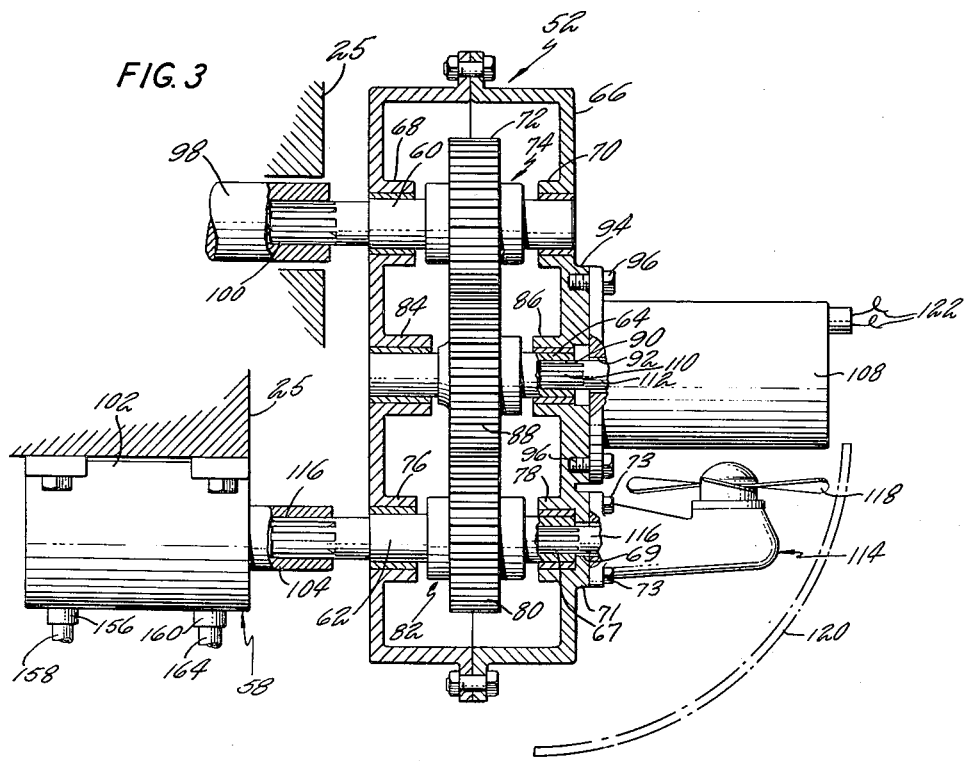
FIG. 3 is an enlarged view of the drive unit located between the aircraft and auxiliary engines and the generator showing a fan for generator cooling.
Figure 2:
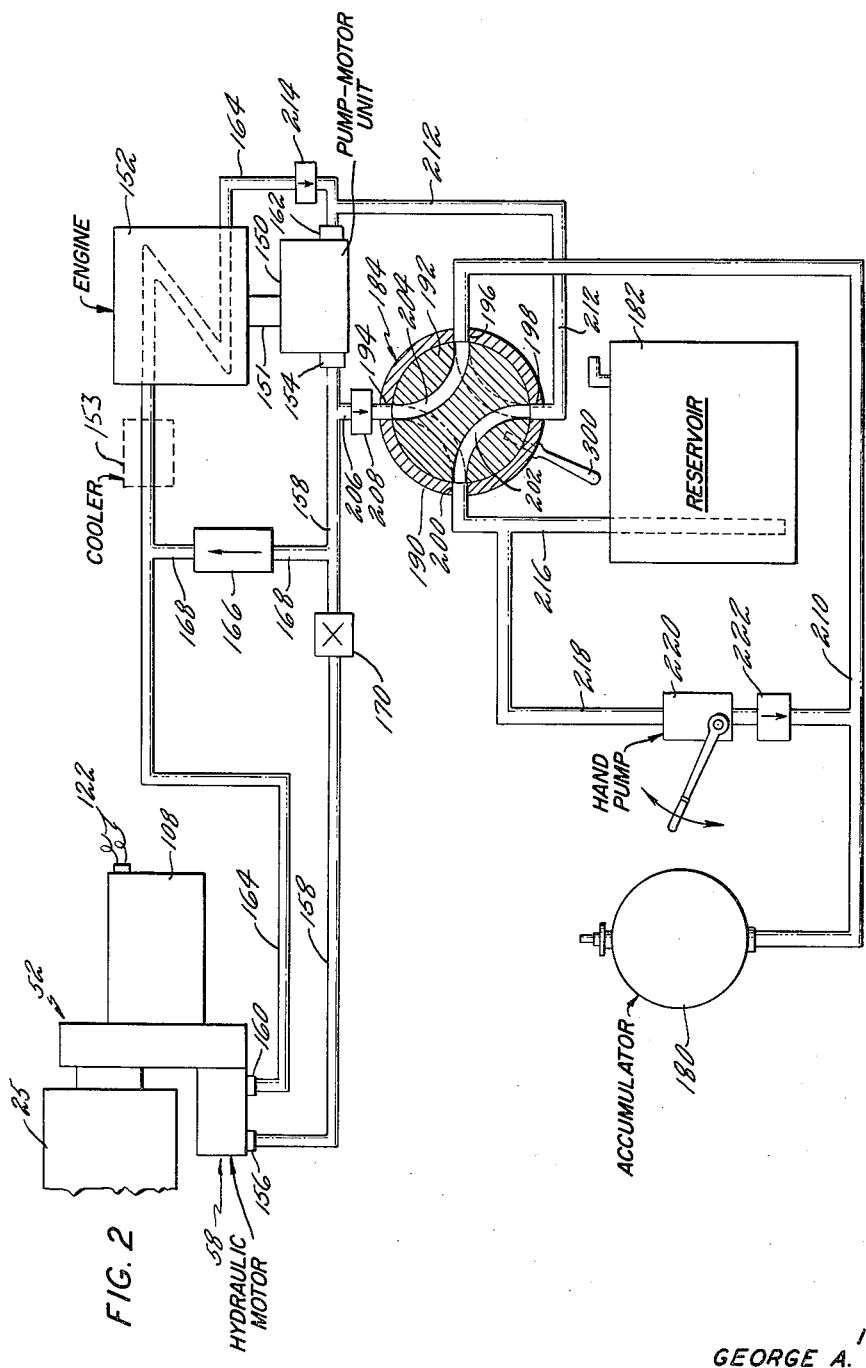
FIG. 2 is a diagrammatic view showing the auxiliary power system for operating the aircraft generator along with a portion of an aircraft engine.

The driving device 52, see FIG. 3, is a transmission unit having two input shafts 60 and 62 and one output shaft 64. This device or unit 52 comprises a two-piece housing 66 in which the two input shafts and output shaft are rotatably mounted. Shaft 60 is mounted within the housing 66 on bearings fixed within bosses 68 and 70. A gear 72 is mounted on said shaft by a free wheeling unit or one-way drive clutch 74. Shaft 62 is mounted within the housing 66 on bearings fixed within bosses 76 and 78. A gear 80 is mounted on said shaft by a free wheeling unit or one-way drive clutch 82. One end of shaft 60 extends to the exterior of housing 66 and is splined at its end and one end of shaft 62 extends to the exterior of housing 66 and is splined at its end. The other end of shaft 62 is recessed and formed with internal splines 67. An opening 69 in the side of housing 66 permits access to said splined recess. A mounting pad 71 having bolts 73 is formed around the opening 69.

Shaft 64 is mounted within the housing 66 on bearings fixed within bosses 84 and 86. A gear 88 is fixedly mounted on shaft 64. This may be done by means of a key. One end of shaft 64 is recessed and formed with internal splines 90. An opening 92 in the side of housing 66 permits access to said splined recess. A regular accessory mounting pad 94 having bolts 96 is formed around the access opening on housing 66.

Shafts 60, 62 and 64 are positioned within housing 66 so that gear 72 meshes with gear 88 and gear 80 meshes with gear 88. The free wheeling unit or one-way drive clutch 74 is arranged so that rotation of input shaft 60 will rotate gear 72 which will in turn rotate gear 88 and rotation of gear 72 by gear 88 will not transmit any force to shaft 60. The free wheeling unit 82, similar to unit 74, is arranged so that rotation of input shaft 62 will rotate gear 80 which will in turn rotate gear 88 and rotation of gear 80 by gear 88 will not transmit any force to shaft 62. This transmission unit permits shaft 64 to be driven by either shaft 60 or shaft 62 without feeding back any force into the shaft not in operation or which is rotating at a slower speed.

The mounting device or transmission unit 52 can be mounted within a nacelle 30 by any satisfactory means. This device or unit is mounted so that an engine accessory drive shaft 98 having an internally splined section 100 engages the external splines of shaft 60. An auxiliary power device 58, having a hydraulic motor 102 with an output shaft 104 is mounted on aircraft structure so that said shaft 104 is positioned to actuate shaft 62. This drive is made similar to the engine accessory drive shaft connection by having internal splines 116 on the end of shaft 104 to engage the external splines of shaft 62.

An aircraft generator 108 is mounted on mounting pad 94 by use of the bolts 96 with the external splines 110 on its drive shaft 112 extending through the access opening 92 on housing 66 and engaging the internal splines 90 of output shaft 64. A fan unit 114 is mounted on mounting pad 71 by use of bolts 73. Fan drive shaft 116 is positioned having external splines on its free end extending through opening 69 and engaging internal splines 67 of shaft 62. Fan 118 of said fan unit is located so as to direct its cooling air flow over generator 108 and if necessary over finned areas of housing 66. A shield or air flow guide 120, shown in phantom in FIG. 3, can be used if desired. Electrical lines 122 extending from the generator can be used to provide electrical power to devices necessary for aircraft operation either in the air or on the ground.

The auxiliary power system 50 for operating the power device 58 by directing a fluid to the hydraulic motor 102 includes (1) means for driving said hydraulic motor and (2) means for starting said driving means.

The driving means for supplying an actuating fluid to the hydraulic motor 102 includes a pump-motor unit 150 driven by the drive shaft 151 of an internal combustion engine 152. The engine 152 can be one of a number of known existing types. This engine is a non-propulsion engine, that is, this engine does not drive either the main rotor or tail rotor. However, this engine could be used to power hydraulic accessories such as landing gear actuators, taxi gear and so forth. The outlet 154 of pump-motor unit 150 is connected to the inlet 156 of hydraulic motor 102 by conduit 158. The outlet 160 of the hydraulic motor 102 is connected to the inlet 162 of the pump-motor unit 150 by conduit 164. Both conduits 158 and 164 may be finned if required for heat rejection. The conduit 164 is shown extending through the gasoline engine 152. This is shown in this manner as the oil is used for cooling the engine. An external oil cooler 153 can be used if necessary. A case drain line (not shown) may be provided connecting the hydraulic motor with reservoir 182 to compensate for minute leakage past the hydraulic motor elements. A pressure relief valve 166 is placed in a conduit 168 connecting conduits 158 and 164. Valve 166 is used to by-pass the hydraulic motor 102 in the event of failure or closing of valve 170 and to indicate when the pressure in conduit 158 has reached a predetermined value. A blocking valve 170 is interposed in conduit 158 between the point where conduit 168 connects with conduit 158 and the inlet 156 of the hydraulic motor. Valve 170 blocks off flow of fluid to hydraulic motor when starting and is used to obtain maximum pressure for accumulator to be hereinafter described. Valve 170 may open automatically when valve 166 opens.

The starting means for engine 152 includes an accumulator 180 and a reservoir 182. A two-position valve 184, having one position for starting and idling engine 152 and one position for normal operation of system when said engine is running, connects said accumulator and reservoir ot conduits 164 and 158. Two-position valve 184 comprises a housing 190 having a rotatably porting member 192 therein. Housing 190 has four openings 194, 196, 198 and 200 therein. Porting member 192, which is movable between two positions, contains two passageways 202 and 204 therethrough. In the valve "run" position, passageway 202 connects opening 198 with opening 200 and passageway 204 connects opening 194 with opening 196. In its "start" position, porting member 192 has passageway 202 connecting opening 196 with 198 and passageway 204 connecting opening 194 with opening 200. Valve 184 can be actuated by a manual lever 300 fixed thereto. The "start" position of the valve 184 allows cold temperature warm-up of non-propulsion engine.

Conduit 206 connects conduit 158, between outlet 154 of the pump-motor unit 150 and the connection of conduit 168 to conduit 158, to opening 194. A one direction check valve 208 is located in conduit 206 to permit flow only from conduit 158 to opening 194. Conduit 210 connects accumulator 180 to opening 196. A conduit 212 connects conduit 164 to opening 198. One-way check valve 214 is interposed in conduit 164 between engine 152 and the point where conduit 212 is connected therewith. This check valve 214 permits flow only in a direction from engine 152. Conduit 216 connects reservoir 182 to opening 200. While a vent is shown on reservoir 182, it may be pressurized.

In the event of loss of pressure in the accumulator 180, a conduit 218 is located connecting conduit 216 with conduit 210, said conduit 218 having a hand pump 220 interposed therein and a check valve 222 which permits flow only in a direction from said reservoir 182 to conduit 210.

*Operation*

When the aircraft has engine 25 operating, the accessory drive shaft 98 drives the generator 108 through the gears 72 and 88. Gear 88 will in turn rotate gear 80, but in view of the free wheeling unit 82, no force will be transmitted to shaft 62.

When the engine does not have engine 25 operating and it is desired to operate the aircraft generator 108, said generator is driven by hydraulic motor 102 through gears 80 and 88. Gear 88 will in turn rotate gear 72, but in view of the free wheeling unit 74, no force will be transmitted to shaft 60. Hydraulic motor 102 rotates shaft 62 which imparts its motion to gear 80 through the free wheeling unit 82. Shaft 62 is also operatively connected to fan drive shaft 116 for operating the fan when the generator is being driven by the hydraulic motor 102. Hydraulic fluid is delivered to the hydraulic motor through conduit 164 by a pump-motor unit 150. Pump-motor 150 is driven by engine 152 through drive shaft 151.

Automatic means are provided for starting engine 152 which includes an accumulator 180 for delivering fluid under pressure to the inlet of pump-motor 150 to "turn over" drive shaft 151. While an automatic means for starting engine 151 has been provided, a conventional manual starting system would also be provided in the event of any emergency.

When valve 184, having a "run" and "start" position, is placed in its "start" position, the inlet 162 of the hydraulic pump-motor 150 is connected to the accumulator 180 and the outlet 154 is connected to the reservoir 182 by a one-way check valve. This permits fluid to flow through the hydraulic unit, with flow in the other direction being prevented by check valve 214. This action "turns over" drive shaft 151. Blocking valve 170 is in a closed position thereby directing flow to the reservoir 182 for starting.

When valve 184 is placed in its "run" position the outlet 154 of the hydraulic unit is connected to the accumulator 180. In this position the inlet of pump-motor 150 is connected to the reservoir 182. This provides for recharging of the accumulator and a supply of fluid to the system. When valve 184 has been placed in this "run" position as the engine is started, blocking valve 170 is opened when relief valve 166 opens, which indicates that the accumulator has been recharged and the pump-motor 150 is operating to supply motive fluid to motor 102.

It is to be understood that the invention is not limited to the figures herein shown and described, but may be used in other ways without departure from its spirit as defined in the following claims.

I claim:

1. In combination, a motor-driven component, said motor-driven component having an input shaft, a hydraulic motor, said motor having an output shaft, said motor having an inlet and outlet, said output shaft of said motor being drivingly connected to said input shaft of said component, means for providing hydraulic fluid for said motor, said means for providing hydraulic fluid for said motor having an inlet and outlet, an engine, means operatively connecting said engine to said means for providing hydraulic fluid for said motor, a first conduit between the outlet of said means for providing hydraulic fluid for said motor and the inlet of said motor, a second conduit between the outlet of said motor and the inlet of said means for providing hydraulic fluid for said motor, an accumulator, valved means connected between said accumulator and said means for providing hydraulic fluid for said motor whereby said means for providing hydraulic fluid for said motor may be operated as a motor to start said engine, said valved means including a low-pressure discharge to permit flow from the outlet of said means for providing hydraulic fluid for said motor, a third conduit connecting said first conduit and second conduit, a relief valve in said third conduit, and a blocking valve in said first conduit between the place where said third conduit is connected thereto and said motor for preventing flow so that said accumulator can be charged when said means for providing hydraulic fluid for said motor is operated as a pump.

2. In combination, a motor-driven component, said motor-driven component having an input shaft, a hydraulic motor, said motor having an output shaft, said motor having an inlet and outlet, said output shaft of said motor being drivingly connected to said input shaft of said component, means for providing hydraulic fluid for said motor, said means for providing hydraulic fluid for said motor having an inlet and outlet, an engine, means operatively connecting said engine to said means for providing hydraulic fluid for said motor, a first conduit between the outlet of said means for providing hydraulic fluid for said motor and the inlet of said motor, a second conduit between the outlet of said motor and the inlet of said means for providing hydraulic fluid for said motor, means for checking flow in one direction in said second conduit, an accumulator, valved means connected between said accumulator and said means for providing hydraulic fluid for said motor whereby said means for providing hydraulic fluid for said motor may be operated as a motor to start said engine, said valved means including a low-pressure discharge to permit flow from the outlet of said means for providing hydraulic fluid for said motor, and a third conduit included in said valved means having one end connected to said second conduit at a place between said means for checking flow in one direction and the inlet of said means for providing hydraulic fluid for said motor, said means for checking flow in one direction being arranged so that it checks flow in a direction from the inlet of said means for providing hydraulic fluid for said motor.

3. In combination, a motor-driven component, said motor-driven component having an input shaft, a hydraulic motor, said motor having an output shaft, said motor having an inlet and outlet, said output shaft of said motor being drivingly connected to said input shaft of said component, means for providing hydraulic fluid for said motor, said means for providing hydraulic fluid for said motor having an inlet and outlet, an engine, means operatively connecting said engine to said means for providing hydraulic fluid for said motor, a first conduit between the outlet of said means for providing hydraulic fluid for said motor and the inlet of said motor, a second conduit between the outlet of said motor and the inlet of said means for providing hydraulic fluid for said motor, means for checking flow in one direction in said second conduit, an accumulator, valved means connected between said accumulator and said means for providing hydraulic fluid for said motor whereby said means for providing hydraulic fluid for said motor may be operated as a motor to start said engine, said valved means including a low-pressure discharge to permit flow from the outlet of said means for providing hydraulic fluid for said motor, a third conduit included in said valved means having one end connected to said second conduit at a place between said means for checking flow in one direction and the inlet of said means for providing hydraulic fluid for said motor, and a blocking valve in said first conduit for preventing flow so that said accumulator can be charged when said means for providing hydraulic fluid for said motor is operated as a pump.

4. In combination, a motor-driven component, said motor-driven component having an input shaft, a hydraulic motor, said motor having an output shaft, said motor having an inlet and outlet, said output shaft of said motor being drivingly connected to said input shaft of said component, means for providing hydraulic fluid for said motor, said means for providing hydraulic fluid for said motor having an inlet and outlet, an engine, means operatively connecting said engine to said means for providing hydraulic fluid for said motor, a first conduit between the outlet of said means for providing hydraulic fluid for said motor and the inlet of said motor, a second conduit between the outlet of said motor and the inlet of said means for providing hydraulic fluid for said motor, means for checking flow in one direction in said second conduit, an accumulator, valved means connected between said accumulator and said means for providing hydraulic fluid for said motor whereby said means for providing hydraulic fluid for said motor may be operated as a motor to start said engine, said valved means including low-pressure discharge to permit flow from the outlet of said means for providing fluid for said motor, a third conduit included in said valved means having one end connected to said second conduit at a place between said means for checking flow in one direction and the inlet of said means for providing hydraulic fluid for said motor, a fourth conduit connecting said first conduit and second conduit, a relief valve in said fourth conduit, and a blocking valve in said first conduit between the place where said fourth conduit is connected thereto and said motor for preventing flow so that said accumulator can be charged when said means for providing hydraulic fluid for said motor is operated as a pump.

5. In combination, a motor-driven component, said motor driven component having an input shaft, a hydraulic motor, said motor having an output shaft, said motor having an inlet and outlet, said output shaft of said motor being drivingly connected to said input shaft of said component, means for providing hydraulic fluid for said motor, said means for providing hydraulic fluid for said motor having an inlet and outlet, an engine, means operatively connecting said engine to said means for providing hydraulic fluid for said motor, a first conduit between the outlet of said means for providing hydraulic fluid for said motor and the inlet of said motor, a second conduit between the outlet of said motor and the inlet of said means for providing hydraulic fluid for said motor, means for checking flow in one direction in said second conduit, an accumulator, valved means connected between said accumulator and said means for providing hydraulic fluid for said motor whereby said means for providing hydraulic fluid for said motor may be operated as a motor to start said engine, a reservoir, said valved means including a low-pressure discharge to permit flow from the outlet of said means for providing hydraulic fluid for said motor to said reservoir, and a third conduit included in said valved means having one end connected to said second conduit at a place between said means for checking flow in one direction and the inlet of said means for providing hydraulic fluid for said motor, said means for checking flow in one direction being arranged so that it checks flow in a direction from the inlet of said means for providing hydraulic fluid for said motor.

6. In combination, a motor-driven component, said motor-driven component having an input shaft, a hydraulic motor, said motor having an output shaft, said motor having an inlet and outlet, said output shaft of said motor being drivingly connected to said input shaft of said component, means for providing hydraulic fluid for said motor, said means for providing hydraulic fluid for said motor having an inlet and outlet, an engine, means operatively connecting said engine to said means for providing hydraulic fluid for said motor, a first conduit between the outlet of said means for providing hydraulic fluid for said motor and the inlet of said motor, a second conduit between the outlet of said motor and the inlet of said means for providing hydraulic fluid for said motor, means for checking flow in one direction in said second conduit, an accumulator, a reservoir, valved means connected to said accumulator, reservoir and means for providing hydraulic fluid for said motor whereby said means for providing hydraulic fluid for said motor may be operated as a motor to start said engine, said valved means including a third conduit connected to the outlet of said means for providing hydraulic fluid for said motor, said valved means including a fourth conduit connected to the inlet of said means for providing hydraulic fluid for said motor, said valved means including a fifth conduit connected to said accumulator, said valved means including a sixth conduit connected to said reservoir, said valved means including valve means for connecting said third conduit to said sixth conduit and said fourth conduit to said fifth conduit, and said means for checking flow in one direction being arranged so that it checks flow in a direction from the inlet of said means for providing hydraulic fluid for said motor.

7. In combination, a motor-driven component, said motor-driven component having an input shaft, a hydraulic motor, said motor having an output shaft, said motor having an inlet and outlet, said output shaft of said motor being drivingly connected to said input shaft of said component, means for providing hydraulic fluid for said motor, said means for providing hydraulic fluid for said motor having an inlet and outlet, an engine, means operatively connecting said engine to said means for providing hydraulic fluid for said motor, a first conduit between the outlet of said means for providing hydraulic fluid for said motor and the inlet of said motor, a second conduit between the outlet of said motor and the inlet of said means for providing hydraulic fluid for said motor, means for checking flow in one direction in said second conduit, an accumulator, a reservoir, valved means connected to said accumulator, reservoir and means for providing hydraulic fluid for said motor whereby said means for providing hydraulic fluid for said motor may be operated as a motor to start said engine and said accumulator can be charged when said means for providing hydraulic fluid for said motor is operated as a pump, said valved means including a third conduit connected to the outlet of said means for providing hydraulic fluid for said motor, said valved means including a fourth conduit connected to the inlet of said means for providing hydraulic fluid for said motor, said valved means including a fifth conduit connected to said accumulator, said valved means including a sixth conduit connected to said reservoir, said valved means including valve means having two positions, said valve means in one position connecting said third conduit to said sixth conduit and said fourth conduit to said fifth conduit, said valve means in another position connecting said third conduit to said fifth conduit and said fourth conduit to said sixth conduit, said means for checking flow in one direction being arranged so that it checks flow in a direction from the inlet of said means for providing hydraulic fluid for said motor, and a blocking valve in said first conduit for preventing flow so that accumulator can be charged.

8. In combination, a motor-driven component, said motor-driven component having an input shaft, a hydraulic motor, said motor having an output shaft, said motor having an inlet and outlet, said output shaft of said motor being drivingly connected to said input shaft of said component, means for providing hydraulic fluid for said motor, said means for providing hydraulic fluid for said motor having an inlet and outlet, an engine, means operatively connecting said engine to said means for providing hydraulic fluid for said motor, a first conduit between the outlet of said means for providing hydraulic fluid for said motor and the inlet of said motor, a second conduit between the outlet of said motor and the inlet of said means for providing hydraulic fluid for said motor, means for checking flow in one direction in said second conduit, an accumulator, valved means connected between said accumulator and said means for providing hydraulic fluid for said motor whereby said means for providing hydraulic fluid for said motor may be operated as a motor to start said engine, a reservoir, said valved means including a low-pressure discharge to permit flow from the outlet of said means for providing hydraulic fluid for said motor to said reservoir, a third conduit included in said valved means having one end connected to said second conduit at a place between said means for checking flow in one direction and the inlet of said means for providing hydraulic fluid for said motor, and means connected between said reservoir and said accumulator to charge said accumulator, said means for checking flow in one direction being arranged so that it checks flow in a direction from the inlet of said means for providing hydraulic fluid for said motor.

References Cited in the file of this patent

UNITED STATES PATENTS

| | | |
|---|---|---|
| 1,638,146 | Buchenberg | Aug. 9, 1927 |
| 2,258,160 | Nardone | Oct. 7, 1941 |
| 2,557,933 | Beaman et al. | June 26, 1951 |
| 2,723,531 | Wosika et al. | Nov. 15, 1955 |
| 2,838,908 | Forster | June 17, 1958 |